United States Patent
Wang (10) Patent No.: US 12,517,757 B2
(45) Date of Patent: Jan. 6, 2026

(54) METHOD AND APPARATUS FOR ADJUSTING INSTRUCTION PIPELINE, MEMORY AND STORAGE MEDIUM

(71) Applicant: Beijing ESWIN Computing Technology Co., Ltd., Beijing (CN)

(72) Inventor: Xiaogeng Wang, Beijing (CN)

(73) Assignee: BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 547 days.

(21) Appl. No.: 18/072,874

(22) Filed: Dec. 1, 2022

(65) Prior Publication Data

US 2023/0168927 A1    Jun. 1, 2023

(30) Foreign Application Priority Data

Dec. 1, 2021    (CN) .......................... 202111452324.5

(51) Int. Cl.
  *G06F 9/48* (2006.01)
  *G06F 9/30* (2018.01)
  *G06F 9/38* (2018.01)

(52) U.S. Cl.
  CPC ........ *G06F 9/4881* (2013.01); *G06F 9/30032* (2013.01); *G06F 9/3836* (2013.01)

(58) Field of Classification Search
  CPC .............. G06F 9/4881; G06F 9/30032; G06F 9/3836; G06F 9/3826; G06F 9/3838; G06F 9/3004; G06F 9/5027
  See application file for complete search history.

(56) References Cited

U.S. PATENT DOCUMENTS

| | | | |
|---|---|---|---|
| 9,372,695 B2 * | 6/2016 | Gschwind | G06F 8/433 |
| 2005/0081017 A1 * | 4/2005 | Rupley, II | G06F 9/384 |
| | | | 712/E9.05 |
| 2013/0086361 A1 * | 4/2013 | Gschwind | G06F 9/3856 |
| | | | 712/205 |
| 2016/0274916 A1 * | 9/2016 | Kobayashi | G06F 9/3867 |
| 2019/0163483 A1 * | 5/2019 | Silberman | G06F 9/3851 |

FOREIGN PATENT DOCUMENTS

| | | | | |
|---|---|---|---|---|
| CN | 105988775 A | | 10/2016 | |
| CN | 108427573 A | * | 8/2018 | ......... G06F 9/30007 |
| CN | 111443948 A | * | 7/2020 | ......... G06F 9/30098 |

* cited by examiner

*Primary Examiner* — Peng Ke
(74) *Attorney, Agent, or Firm* — Scully, Scott, Murphy & Presser, P.C.

(57) ABSTRACT

A method and an apparatus for adjusting an instruction pipeline, a memory and a storage medium. The method for adjusting the instruction pipeline includes: receiving a move-type instruction, wherein the move-type instruction includes a target operand and a first source operand, and indicates to move a data of a source address indicated by the first source operand to a target address indicated by the target operand; receiving an object instruction located after the move-type instruction in an instruction sequence, wherein the object instruction includes an object source operand, indicating that an object operation is performed with a source address indicated by the object source operand; and replacing the object source operand in the object instruction with the first source operand of the move-type instruction to obtain a modified instruction, in response to the target operand of the move-type instruction being identify to the object source operand of the object instruction.

12 Claims, 6 Drawing Sheets

METHOD AND APPARATUS FOR ADJUSTING INSTRUCTION PIPELINE, MEMORY AND STORAGE MEDIUM

CROSS REFERENCE

The application claims priority to Chinese patent application No. 202111452324.5, filed on Dec. 1, 2021, the entire disclosure of which is incorporated herein by reference as part of the present application.

TECHNICAL FIELD

Embodiments of the present disclosure relate to a method for adjusting an instruction pipeline, an apparatus for adjusting an instruction pipeline, a memory and a storage medium.

BACKGROUND

In order to improve the performance of CPU, CPU can use a pipeline, in which the whole process of extracting, decoding, executing and writing results of an instruction is divided into multiple pipeline stages, and an instruction can only run in a certain pipeline stage at a certain time; and in the CPU, multiple instructions can run in different pipeline stages. Each pipeline stage may include multiple pipeline levels, and each pipeline level performs limited operations to further improve the performance of CPU.

SUMMARY

At least one embodiment of the present disclosure provides a method for adjusting an instruction pipeline, which includes the following steps: receiving a move-type instruction, wherein the move-type instruction includes a target operand and a first source operand, and the move-type instruction indicates to move a data of a source address indicated by the first source operand to a target address indicated by the target operand; receiving an object instruction located after the move-type instruction in an instruction sequence, wherein the object instruction includes an object source operand, indicating that an object operation is performed with a source address indicated by the object source operand; and replacing the object source operand in the object instruction with the first source operand of the move-type instruction to obtain a modified instruction, in response to the target operand of the move-type instruction being identical to the object source operand of the object instruction.

For example, in at least one embodiment, the method for adjusting the instruction pipeline further includes: executing the modified instruction to perform the object operation with the source address indicated by the first source operand of the move-type instruction.

For example, in at least one embodiment, the method for adjusting the instruction pipeline, before replacing the object source operand in the object instruction with the first source operand of the move-type instruction to obtain the modified instruction, further includes: determining that the target operand of the move-type instruction does not point to a target address where a constant is stored.

For example, in at least one embodiment, the method for adjusting the instruction pipeline, before replacing the object source operand in the object instruction with the first source operand of the move-type instruction to obtain the modified instruction, further includes: determining that an execution order of the move-type instruction and the object instruction in the instruction sequence is not broken by a previous transfer instruction.

For example, in at least one embodiment, the method for adjusting the instruction pipeline, before replacing the object source operand in the object instruction with the first source operand of the move-type instruction to obtain the modified instruction, further includes: receiving an intermediate instruction between the move-type instruction and the object instruction in the instruction sequence, wherein the intermediate instruction includes an intermediate target operand; and determining that the intermediate target operand of the intermediate instruction is different from the target operand of the move-type instruction.

For example, in at least one embodiment, the method for adjusting the instruction pipeline, before replacing the object source operand in the object instruction with the first source operand of the move-type instruction to obtain the modified instruction, further includes: receiving an intermediate instruction between the move-type instruction and the object instruction in the instruction sequence, wherein the intermediate instruction includes an intermediate target operand; and determining that the intermediate target operand of the intermediate instruction is different from the first source operand of the move-type instruction.

For example, in at least one embodiment, in the method of adjusting the instruction pipeline, for a superscalar processor, the move-type instruction, the intermediate instruction and the object instruction are in a same instruction cycle, or at least two of the move-type instruction, the intermediate instruction or the object instruction are in different instruction cycles.

For example, in at least one embodiment, in the method for adjusting the instruction pipeline, for a superscalar processor, the object instruction and the move-type instruction belong to a same instruction cycle or different instruction cycles.

For example, in at least one embodiment, in the method for adjusting the instruction pipeline, the move-type instruction includes a move instruction or an equivalent instruction which is equivalent to the move instruction.

For example, in at least one embodiment, in the method for adjusting the instruction pipeline, the move-type instruction further includes a second source operand, and the second source operand points to zero.

At least one embodiment of the present disclosure further provides an apparatus for adjusting an instruction pipeline, which includes an instruction receiving circuit and an instruction modification circuit; the instruction receiving circuit is configured to receive a move-type instruction and an object instruction located after the move-type instruction in an instruction sequence, wherein the move-type instruction includes a target operand and a first source operand, the move-type instruction indicates to move a data of a source address indicated by the first source operand to a target address indicated by the target operand, and the object instruction includes an object source operand, indicating that an object operation is performed using a source address indicated by the object source operand; and the instruction modification circuit is configured to replace the object source operand in the object instruction with the first source operand of the move-type instruction to obtain a modified instruction, in response to the target operand of the move-type instruction being identical to the object source operand of the object instruction.

At least one embodiment of the present disclosure further provides an apparatus for adjusting an instruction pipeline, which includes a memory and a processing apparatus; the memory is configured to non-temporarily store a computer-executable instruction, and the processing apparatus is configured to run the computer-executable instruction, wherein when the computer-executable instruction is run by the processing apparatus, the method for adjusting the instruction pipeline described in any of the above-mentioned embodiments is executed.

At least one embodiment of the present disclosure further provides a non-transitory storage medium that stores a computer-executable instruction non-transitorily, wherein when the computer-executable instruction is executed by a computer, the method for adjusting the instruction pipeline described in any of the above-mentioned embodiments is executed.

At least one embodiment of the present disclosure further provides a processor including the apparatus for adjusting the instruction pipeline as described in any of the above-mentioned embodiments.

BRIEF DESCRIPTION OF THE DRAWINGS

In order to clearly illustrate the technical solution of the embodiments of the present disclosure, the drawings of the embodiments will be briefly described. It is obvious that the described drawings in the following are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Figure 1A:
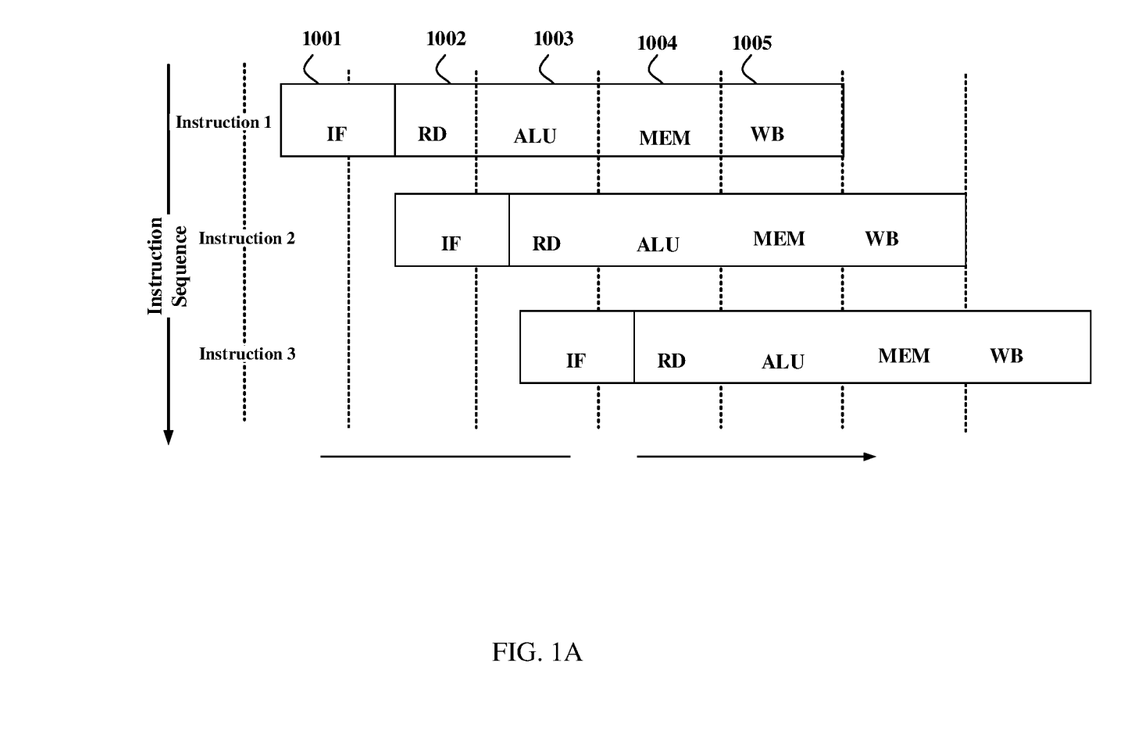
FIG. 1A illustrates an exemplary scalar central processing unit (CPU) instruction pipeline.

FIG. 1A illustrates an exemplary scalar central processing unit (CPU) instruction pipeline, the instruction pipeline includes a five-stage pipeline, and each instruction can be issued in each clock cycle and executed in a fixed duration (e.g., 5 clock cycles). The execution of each instruction is divided into five steps: an instruction fetch (IF) stage 1001, a register read (RD) stage (or a decoding stage) 1002, an arithmetic/logic unit (ALU) stage (or an execution stage) 1003, a memory access (MEM) stage 1004 and a write-back (WB) stage 1005. In the IF stage 1001, a specified instruction is fetched from an instruction cache. Part of the fetched specified instruction is used to specify a source register that can be used to execute instructions. In the RD stage 1002, decoding is performed and control logic is generated, and the contents of the specified source register are fetched. According to the control logic, arithmetic or logical operation is performed in the ALU stage 1003 with the fetched contents. In the MEM stage 1004, executing an instruction can reads/writes a memory in a data cache. Finally, in WB stage 1005, the value obtained by executing the instruction can be written back to a certain register.

The pipeline shown in FIG. 1A may execute simple instruction sequence smoothly, and one instruction can be executed in each clock cycle. However, the instruction sequence in a program is not always a simple sequence, and correlations usually exist between instructions, which may lead to conflicts or even errors in pipeline execution. At present, the main factors affecting the pipeline may be divided into three categories: a resource conflict (structure correlation), a data conflict (data correlation) and a control conflict (control correlation).

In a program, if two instructions access the same register or memory address, and at least one of the two instructions is a write instruction, then data correlation exists between the two instructions. According to the order of reading and writing in conflict access, the data correlation may be divided into three situations: RAW (Read After Write), WAW (Write After Write) and (Write After Read). For RAW (Read After Write), the following instruction need to use the data written before, which is also called true correlation. For WAW (Write After Write), two instructions write to the same target address, which is also called output correlation. For WAR (Write After Read), the following instruction overwrites the target address read by the previous instruction, which is also called anti-correlation.

The possible pipeline conflict of WAW (Write After Write) and WAR (Write After Read) can be solved by register renaming technology. The possible pipeline conflict of RAW (Read After Write) can be solved by blocking technology, pipeline forwarding technology, etc. For the blocking technology, the register where the blocked pipeline level is located is kept unchanged, while an instruction invalidation signal is input to a pipeline level next to the blocked pipeline level, and the pipeline bubble is used for filling. For the pipeline forwarding technology, the calculation result of the execution (EX) stage of the current pipeline level is directly sent to the decoding stage of the next pipeline level as the input of the EX stage of the next pipeline level, that is, a forwarding path exists from the execution stage to the decoding stage. For example, a forwarding path may also exists from the memory access stage to the decoding stage.

Figure 1B:
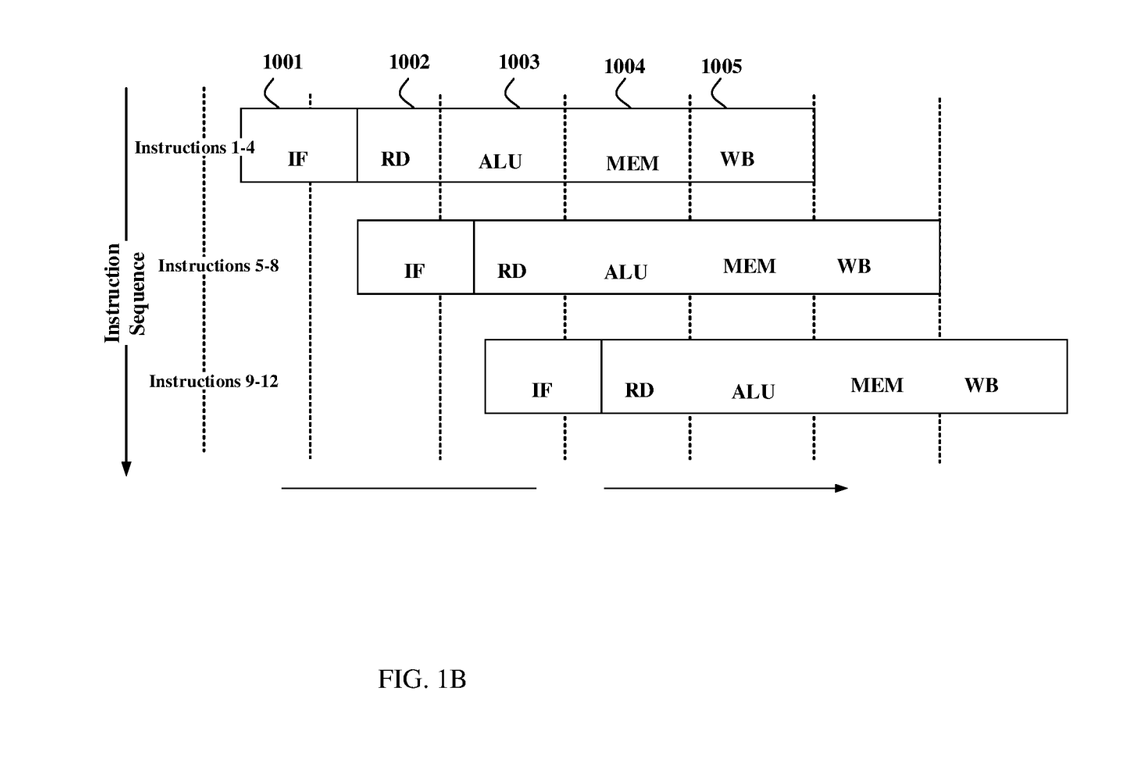
FIG. 1B illustrates an exemplary superscalar central processing unit (CPU) instruction pipeline.

In a conventional scalar pipeline shown in FIG. 1A, the average number of instructions executed in each clock cycle is less than or equal to 1, that is, the instruction-level parallelism of the pipeline is less than or equal to 1. Superscalar refers to the method of executing multiple instructions in parallel in one cycle. A processor that has increased instruction-level parallelism and can process multiple instructions in one cycle is called a superscalar processor. The superscalar processor adds additional resources to the conventional scalar processor, and creates multiple pipelines, and each of the multiple pipelines executes the instructions assigned to it to achieve parallelism. FIG. 1B illustrates an exemplary superscalar central processing unit (CPU) instruction pipeline, and each level in the pipeline can input four instructions in parallel. For example, instructions 1-4 are processed in parallel, instructions 5-8 are processed in parallel, and instructions 9-12 are processed in parallel. In the superscalar pipeline shown in FIG. 1B, the average number of instructions executed in each clock cycle is greater than 1, that is, the instruction-level parallelism of the superscalar pipeline is greater than 1.

For example, the superscalar processor may further support out-of-order execution. The out-of-order execution refers to the technology that CPU allows multiple instructions to be separately sent to corresponding circuit units for processing without the order specified by the program. The out-of-order execution involves many algorithms, which are basically designed on the basis of a reservation station. The core idea of the reservation station is to send the decoded instruction to its own reservation station for preservation according to its own instruction type. If all operands of the instruction are ready, it can start out-of-order transmission.

For the CPU that adopts the out-of-order execution and the superscalar technology, although the register renaming technology is used to solve WAW (Write After Write) data correlation and WAR (Write After Read) data correlation, the blocking and pipeline forwarding technology can't solve RAW (Read After Write) data correlation well. The affected instruction may only wait in the reservation station but can't be sent to a execution unit, resulting in some idle resources of the execution unit, which ultimately affects the overall performance of the CPU.

The inventor(s) of the present disclosure noticed that, for RSIC-V instruction set (ISA), an exemplary instruction sequence generated by compiling a typical program (such as CoreMark, a benchmark test program proposed by Shay Gla-On of EEMBC (Embedded Microprocessor Benchmark Consortium) in 2009) with compiler gcc is as follows:

| | | |
|---|---|---|
| mv | x8, x15 | |
| ld | x5, 0(x8). | |

In the above-mentioned instruction sequence, the instruction mv indicates to copy data between general registers, and the data in register x15 is moved to register x8 here. The instruction ld is used to load data into the general register with the address of "source operand plus offset". Here, the value stored in x8 plus offset 0 is used as the address to read the value in the memory, and the read value is written into register x5. Therefore, in this instruction sequence, the source register (rs) of the following instruction ld and the destination register (rd) of the preceding instruction mv are both the register x8, that is, RAW (Read After Write) data correlation exists between the instruction mv and the instruction ld. Therefore, it is usually necessary to wait until the instruction mv is executed and ready to be written back before the following instruction ld can be sent and executed. Although the instruction mv involves an operation, in fact, the value in its source register (the register x15 in the above-mentioned example) is not modified. After the execution, the register x8 and the register x15 have the same value.

Then, if the rs of the instruction ld is changed from indicating the register x8 to indicting the register x15, the following instruction will be obtained after modification:

ld x5, 0(x15).

Then the result of executing the modified instruction is the same as that of the previous instruction "ld x5, 0(x8)". Therefore, by "forwarding" the value of the register x15 to the instruction ld, the "true correlation" (i.e., the above-mentioned RAW (Read After Write) data correlation) caused by "use after move" can be eliminated without affecting the function of the above-mentioned instruction sequence.

In addition, for example, in RISC-V instruction set, the instruction mv is a special pseudo instruction. After the instruction mv is decoded, the corresponding base instruction of the instruction mv is addi rd, rs1, 0imm, and the value in the source operand rs1 is added with an immediate number 0 and written back to the target operand rd.

Based on the above-mentioned phenomenon and understanding, at least one embodiment of the present disclosure provides a method for adjusting an instruction pipeline, which includes: receiving a move-type instruction, in which the move-type instruction includes a target operand and a first source operand, and the move-type instruction indicates to move a data of a source address indicated by the first source operand to a target address indicated by the target operand; receiving an object instruction located after the move-type instruction in an instruction sequence, in which the object instruction includes an object source operand, indicating that an object operation is performed with a source address indicated by the object source operand; and replacing the object source operand in the object instruction with the first source operand of the move-type instruction to obtain a modified instruction, in response to the target operand of the move-type instruction being identical to the object source operand of the object instruction. The method for adjusting an instruction pipeline provided by the embodiment of the present disclosure can eliminate the RAW (Read After Write) data correlation involving the move-type instruction with less resources, and significantly improve the performance of the CPU.

At least one embodiment of the present disclosure further provides an apparatus for adjusting an instruction pipeline corresponding to the above-mentioned method, a processor including the apparatus for adjusting an instruction pipeline, and a non-transitory storage medium that non-transitorily stores the computer-executable instruction used for implementing the above-mentioned method.

The embodiments of the present disclosure will be described below with specific examples.

Figure 2:
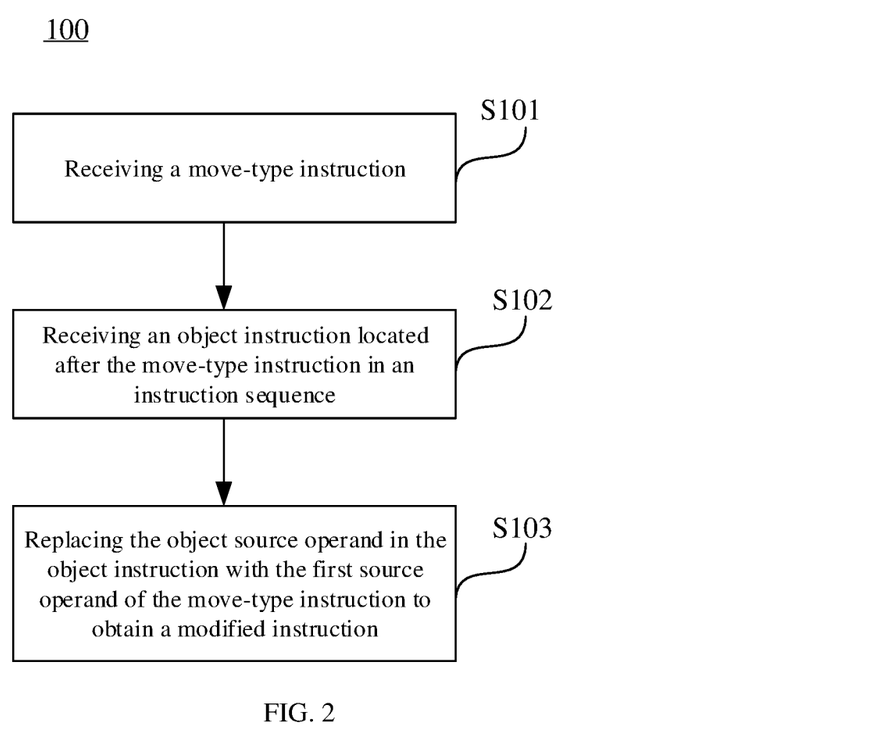
FIG. 2 illustrates a method for adjusting an instruction pipeline provided by at least one embodiment of the present disclosure.

As shown in FIG. 2, at least one embodiment of the present disclosure provides a method 100 for adjusting an instruction pipeline, which includes steps S101 to S103.

Step S101: receiving a move-type instruction.

The move-type instruction includes a target operand and a first source operand, and the move-type instruction indicates to move the data of a source address indicated by the first source operand to a target address indicated by the target operand. According to the specific example of the move-type instruction, the move-type instruction may further include a second source operand, such as an immediate number, a fixed register, or the like.

Step S102: receiving an object instruction located after the move-type instruction in an instruction sequence.

The object instruction is located after the move-type instruction in the instruction sequence, includes an object source operand, and indicates that an object operation is performed with a source address indicated by the object source operand. The embodiments of the present disclosure have no specific limitation on the object instruction, and the object instruction includes one or more object source addresses, and may also include its own target address, etc.

Step S103: replacing the object source operand in the object instruction with the first source operand of the move-type instruction to obtain a modified instruction, in response to the target operand of the move-type instruction being identical to the object source operand of the object instruction. In the case that the target operand of the move-type instruction is identical to the object source operand of the object instruction, the object source operand in the object instruction is replaced with the first source operand of the move-type instruction to obtain the modified instruction, and the modified instruction will be used as the executed instruction later.

Therefore, in at least one embodiment, the method for adjusting the instruction pipeline further includes executing the modified instruction to perform the object operation with the source address indicated by the first source operand of the move-type instruction.

In various embodiments of the present disclosure, the term "move-type instruction" refers to an instruction that substantially copies data between registers/memory addresses indicated by two operands, and the move-type instruction includes a target operand and one or more source operands. After the move-type instruction is executed, the value of the register/memory address indicated by the target operand is identical to the value of the register/memory address indicated by one of the source operands. For example, in at least one embodiment of the present disclosure, the "move-type instruction" includes a move instruction itself or an equivalent instruction equivalent to the move instruction. For example, for the instruction set of RISC-V, examples of the move-type instruction include but are not limited to:

instruction mv: mv rd, rs1
instruction addi equivalent to the instruction mv: addi rd, rs1, 0 (i.e., the immediate number is 0)
instruction c.mv: c.mv rd, rs1
instruction add equivalent to the instruction c.mv: add rd, x0, rs2 (i.e., rs1 is defaulted to register x0)
instruction sub equivalent to the instruction c.mv: sub rd, rs1, x0 (i.e., rs2 is defaulted to register x0)
instruction fmv: fmv.s rd rs1 and fmv.d rd rs1
instruction fsgnj equivalent to the instruction fmv (fmv.s and fmv.d): fsgnj.s rd, rs1, rs2 and fsgnj.d rd rs1 rs2.

In the above-mentioned move-type instructions, for example, the source operand rs1 of the instruction mv, the source operand rs1 of the instruction addi, the source operand rs1 of the instruction c.mv, the source operand rs2 of the instruction add, the source operand rs1 of the instruction sub, the source operand rs1 of the instruction fmv and the source operand rs1 of the instruction fsgnj correspond to the "first source operand" in the above-mentioned method 100. The register x0 (zero register) is specially used to store the constant 0, that is, the value of this register is always equal to zero.

The "move-type instruction" of the present disclosure may also be applied to the other instruction set, for example, a complex instruction set (CISC), such as a X86 instruction set, and the embodiments of the present disclosure are not limited to this.

Figure 3:
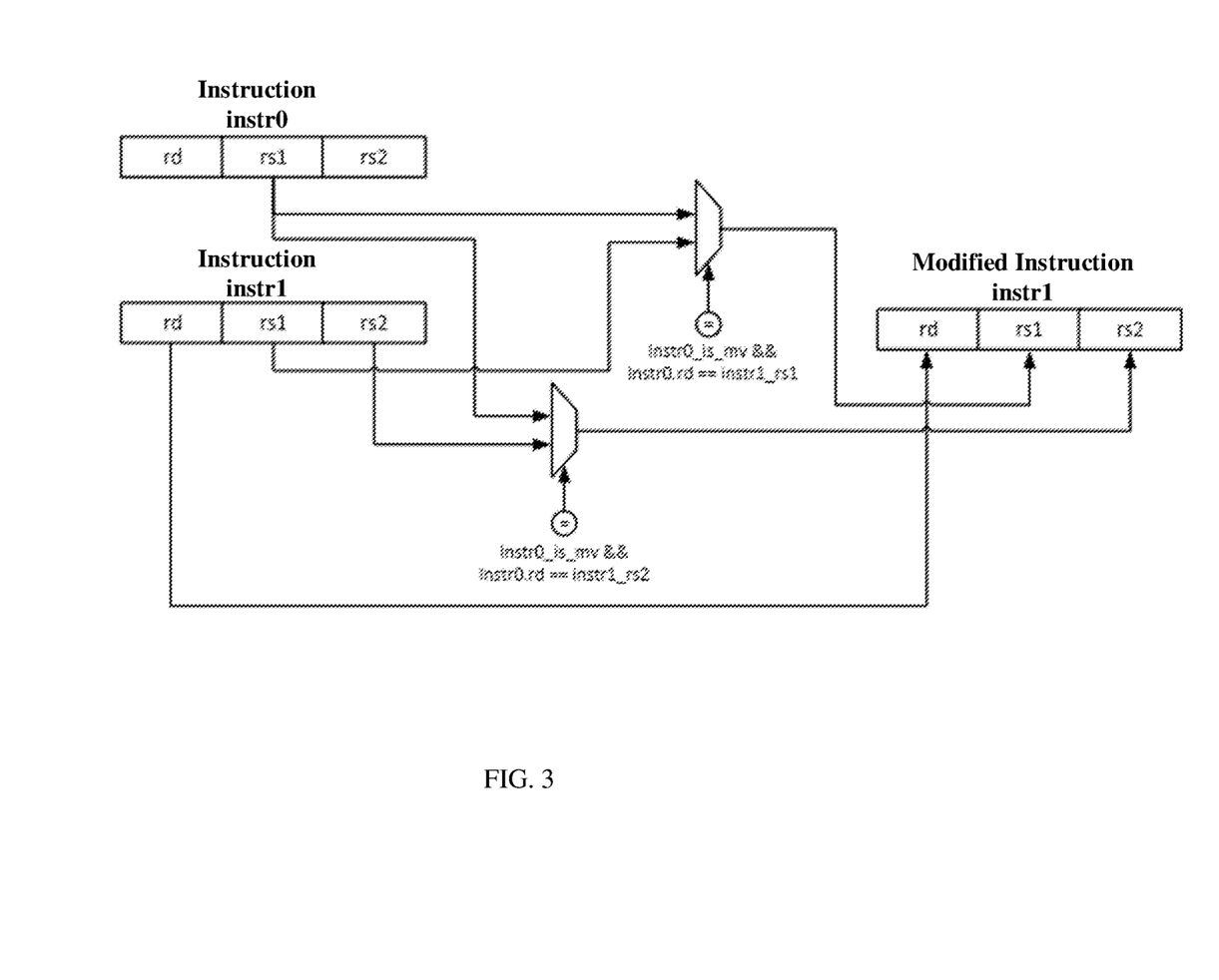
FIG. 3 illustrates a schematic diagram of an operand forwarding network in an example.

FIG. 3 illustrates a schematic diagram of an operand forwarding network in an example. In the specific example of the instruction mv in the method for adjusting the instruction pipeline in the above-mentioned embodiment, referring to FIG. 3, two instructions instr0 and instr1 in sequential order are present in the instruction sequence (here, the instruction instr1 corresponds to the "object instruction" in the method 100). The instruction instr0 has source operands rs1 and rs2, and has a target operand rd, and the instruction instr1 has source operands rs1 and rs2, and has a target operand rd. The following operations are performed for the instruction instr0 and the instruction instr1.

Firstly, it is determined whether the previous instruction instr0 is an instruction mv (i.e., instr0_is_mv). Secondly, it is determined whether one of the two source operands rs1 and rs2 of the instruction instr1 is identical to the target operand rd of the instruction instr0 (i.e., instr0.rd==instr1.rs1 or instr0.rd==instr1.rs2). In the case where one of these situations exists, that is, (instr0_is_mv && instr0.rd==instr1.rs1) is true or (instr0_is_mv && instr0.rd==instr1.rs2) is true, then the instruction instr1 is modified to obtain a modified instruction instr1, and the value of the source operand rs1 or rs2 in the source instruction instr1 is replaced with the value of the source operand rs1 of the instruction instr0 (because rs2 in the instruction mv is null by default). After that, the modified instruction instr1 is executed, thus the operand forwarding is achieved, and the RAW (Read After Write) data correlation in the case of the move-type instruction in the instruction sequence is overcome, so that the source instruction instr1 can be executed in advance (e.g., issued and executed in advance), and the CPU efficiency is improved.

For example, in a typical example, the instruction sequence is as follows:
add x5, x0, x6
mul x10, x5, x7.

In the above-mentioned instruction sequence, because a source operand in the previous instruction add points to 0 (i.e., zero register x0), the instruction add is equivalent to an instruction c.mv, that is, a move-type instruction, and one of the source operands x5 (register x5) of the following instruction mul (corresponding to the "object instruction" in this disclosure, which will not be specifically pointed out below for the similar situation) is identical to the target operand x5 in the previous instruction add, so operand (register x6) forwarding can be performed, and thus the modified instruction mul is obtained: mul x10, x6, x7. Therefore, the instruction add and the modified instruction mul can be executed in parallel, without affecting the result of the instruction mul, and the efficiency of executing the instruction sequence in the CPU is improved.

In the embodiments of the present disclosure, the previous move-type instruction does not need to be directly adjacent to the following object instruction, and one or more other instructions (i.e., intermediate instruction(s)) may present between the previous move-type instruction and the following object instruction. For example, in a typical example, the instruction sequence is as follows:
add x5, x0, x6
div x11, x12, x13
mul x10, x5, x7.

Different from the above-mentioned instruction sequence, an instruction div is inserted between the instruction add as a move-type instruction and the instruction mul as an object instruction, but the instruction div is not related to the operand x5 and the operand x6 actually used by the instruction add, that is, the values of the operand x5 and the operand x6 will not be modified, so the operand forwarding may still be performed, thus obtaining the modified instruction mul: mul x10, x6, x7. Therefore, the modified instruction mul may be executed before the instruction div (for example, at the same time as the instruction add) or at the same time as the instruction div, without affecting the result of the instruction mul, and the efficiency of executing the instruction sequence in the CPU is improved.

In some embodiments of the above-mentioned embodiments, when the above-mentioned method for adjusting the instruction pipeline is performed, for different situations of the move-type instruction, the exceptional situation may be present where the operand forwarding may cause errors.

For example, in at least one embodiment, the method 100, before the object source operand in the object instruction is replaced with the first source operand of the move-type instruction to obtain the modified instruction, further determines the target operand of the move-type instruction does not point to a target address where a constant is stored, otherwise, the method for adjusting the instruction pipeline is stopped to execute. For example, the target address for storing the constant is a zero register (the register x0, whose value is always equal to 0). In the case where the target operand of the move-type instruction points to the target address where a constant is stored, then usually after execution, the value of the target operand of the move-type instruction will not be equal to the value of the source operand of the move-type instruction, so that the source operand of the subsequent object instruction cannot be replaced with the source operand of the move-type instruction. For example, in the method for adjusting the instruction pipeline, in the case where the instruction is an instruction mv, it is determined whether the rd of the instruction mv is the register x0, and if so, the operand forwarding cannot be performed, that is, the method for adjusting the instruction pipeline is not (re)executed, thereby avoiding errors caused by the operand forwarding.

For example, in a typical example, the instruction sequence is as follows:
 add x0, x0, x6
 mul x10, x0, x7.

In the above-mentioned instruction sequence, although a source operand of the previous instruction add points to 0 (i.e., zero register), which is equivalent to the instruction c.mv, the target operand of the instruction add is also zero register, and the value of zero register is always equal to zero, so it is different from the value of source operand x6 (register x6) in most cases. Therefore, although one of the source operands x0 of the following instruction mul is identical to the target operand x0 of the previous instruction add, the operand forwarding cannot be performed.

For example, in at least one embodiment, the method 100, before replacing the object source operand in the object instruction with the first source operand of the move-type instruction to obtain the modified instruction, further determines that the execution order of the move-type instruction and the object instruction in the instruction sequence is not broken by a previous transfer instruction. If the execution order of the move-type instruction and the object instruction in the instruction sequence is broken by the previous transfer instruction, then the object instruction will be executed before the move-type instruction in the execution process of the instruction sequence, so the condition of the operand forwarding is not met between the move-type instruction and the object instruction, and the operand forwarding cannot be performed, that is, the method for adjusting the instruction pipeline is not (re)executed, thereby avoiding errors caused by the operand forwarding.

For example, in a typical example, the instruction sequence is as follows:
 0x10 bne: a short forward branch, jump to 0x18 mul
 0x14 addi x5, x6, 0
 0x18 mul x10, x5, x7.

In the above-mentioned instruction sequence, the fetch addresses of the three consecutive instructions are 0x10, 0x14 and 0x18, respectively, and "a short forward branch, jump to 0x18 mul" means "a short forward branch, jump to instruction mul with address 0x18". The second ranked instruction addi includes the immediate number 0, so the instruction addi is equivalent to an instruction mv, and one of the source operands x5 of the third ranked instruction mul is identical to the target operand x5 in the previous instruction addi. However, the first ranked instruction bne jumps to the instruction mul with the address 0x18, so in actual execution, the instruction mul will be executed immediately after the instruction bne and before the instruction addi. Therefore, the condition for the operand (register x6) forwarding is not met between the instruction addi and the instruction mul, so the operand forwarding cannot be performed, that is, the method for adjusting the instruction pipeline is not (re)executed.

However, in another typical example, the instruction sequence is as follows:
 0x10 bne: a short forward branch, jump to 0x1c div
 0x14 addi x5, x6, 0
 0x18 mul x10, x5, x7
 0x1c div x11, x12, x13.

The fetch addresses of the four consecutive instructions are 0x10, 0x14, 0x18 and 0x1c, respectively, and "a short forward branch, jump to 0x1c div" means "a short forward branch, jump to the instruction div with address 0x1c". The second ranked instruction addi includes the immediate number 0, so the instruction addi is equivalent to an instruction mv, and one of the source operands x5 of the third ranked instruction mul is identical to the target operand x5 in the previous instruction addi. Although the instruction bne is ranked first, and the instruction bne is necessary to jump to the instruction div with address 0x1c, the order relationship between the instruction addi and the instruction mul is not affected by the instruction bne (i.e., it is not broken by a transfer instruction). Therefore, the condition of the operand (register x6) forwarding still exists between the instruction addi and the instruction mul, so that the operand forwarding can be performed and the method for adjusting the instruction pipeline can be performed.

In the embodiment of the present disclosure, the previous move-type instruction does not need to be directly adjacent to the following object instruction, and one or more other instructions (i.e., intermediate instruction(s)) may present between the previous move-type instruction and the following object instruction. In this case, for different situations, the intermediate instruction may have adverse effects on whether the operand forwarding can be achieved, so it is necessary to make a judgment before the forwarding operation to avoid errors caused by the operand forwarding.

For example, in at least one embodiment, before replacing the object source operand in the object instruction with the first source operand of the move-type instruction to obtain the modified instruction, the method 100 further includes: receiving an intermediate instruction between the move-type instruction and the object instruction in the instruction sequence, in which the intermediate instruction includes an intermediate target operand; and determining that the intermediate target operand of the intermediate instruction is different from the target operand of the move-type instruction. In this embodiment, if the intermediate target operand of the intermediate instruction is identical to the target operand of the move-type instruction, after the move-type instruction and the intermediate instruction are executed, the value corresponding to the target operand (e.g., register or memory address) of the original move-type instruction is no longer related to (e.g., equal to) the value corresponding to the first source operand (e.g., register or memory address) of the original move-type instruction, so the condition for the operand forwarding is not met between the move-type instruction and the object instruction, and the operation forwarding cannot be performed, that is, the method for adjusting the instruction pipeline is not (re)executed, thereby avoiding errors caused by the operand forwarding.

For example, in a typical example, the instruction sequence is as follows:
 add x5, x0, x6
 div x5, x12, x13
 mul x10, x5, x7.

In the above-mentioned instruction sequence, an instruction div is inserted between the instruction add and the instruction mul. As an intermediate instruction, the instruction div has corresponding intermediate source operand and intermediate target operand. The (intermediate) target operand x5 (register x5) of the instruction div is identical to the target operand x5 of the previous instruction add, so after the instruction div is executed, the value of register x5 is modified relative to the time when the execution of the previous instruction add is completed, and the value of register x5 will be independent of the source operand x6 (register x6) of the instruction add at this time. The instruction mul after the instruction div will be calculated using the modified value of the register x5. Therefore, the condition of operand (register x6) forwarding is not met between the instruction add and the instruction mul, so the operand forwarding cannot be performed, that is, the method for adjusting the instruction pipeline is not (re)executed, thereby avoiding errors caused by the operand forwarding.

For example, in at least one embodiment, before replacing the object source operand in the object instruction with the first source operand of the move-type instruction to obtain the modified instruction, the method 100 further includes determining that the intermediate target operand of the intermediate instruction is different from the first source operand of the move-type instruction. If the intermediate target operand of the intermediate instruction is identical to the first source operand of the move-type instruction, after the move-type instruction and the intermediate instruction are executed, the value corresponding to the target operand (e.g., register or memory address) of the original move-type instruction is no longer related to (e.g., equal to) the value corresponding to the first source operand (e.g., register or memory address) of the original move-type instruction, so the condition for the operand forwarding is not met between the move-type instruction and the target instruction, and the operand forwarding cannot be performed, that is, the method for the adjustment the instruction pipeline not (re)executed, thereby avoiding errors caused by the operand forwarding.

For example, in a typical example, the instruction sequence is as follows:
 add x5, x0, x6
 div x6, x12, x13
 mul x10, x5, x7.

In the above-mentioned instruction sequence, an instruction div is inserted between the instruction add and the instruction mul. As an intermediate instruction, the instruction div has corresponding intermediate source operand and intermediate target operand. The (intermediate) target operand x6 (register x6) of the instruction div is identical to the (first) source operand x6 of the previous instruction add. Therefore, after the instruction div is executed, the value of the register x6 is modified relative to the time when the execution of the previous instruction add is completed, so the value of the target operand x5 (register x5) of the instruction add will be independent of the source operand x6 (register x6) of the instruction add at this time. Therefore, the condition for the operand (register x6) forwarding is not met between the instruction add and the instruction mul, so the operand forwarding cannot be performed, that is, the method for adjusting the instruction pipeline is not (re) executed.

The above-mentioned method 100 for adjusting an instruction pipeline of the disclosed embodiment can not only be applied to a conventional scalar CPU, for example, in at least one embodiment, the method 100 can also be mainly applied to a CPU adopting the superscalar technology, and the conditions of several input instructions can be checked and forward them in the same cycle. A cache stack can also be added to temporarily store the information of the move instruction that appeared in the previous cycle, so as to check the conditions of several instructions in the next cycle and forward them.

For example, in at least one embodiment, for a superscalar processor (or a superscalar processor that further supports the out-of-order execution), in the method 100, the object instruction and the move-type instruction belong to the same instruction cycle or different instruction cycles.

For example, in a superscalar processor, multiple instructions are decoded and sent to a renaming unit in one instruction cycle. Instructions (e.g., micro instructions (uop)) sent by the decoding unit are detected in the register renaming unit to detect whether the move-type instruction (for example, the instructions mv and c.mv in RISC-V instruction set) according to the embodiment of the present disclosure is presented. In the case that the move-type instruction is presented, it is determined that whether an instruction with a fetch address following the move-type instruction in the same cycle or an instruction in the subsequent cycle satisfies the forwarding condition, and if so, the method according to the embodiment of the present disclosure is executed.

For example, in at least one embodiment, for a superscalar processor (or a superscalar processor that further supports the out-of-order execution), in the method 100, in the case that an intermediate instruction is presented, the intermediate instruction belongs to the same instruction cycle as the move-type instruction or the object instruction, and the move-type instruction and the object instruction belong to different instruction cycles; or the move-type instruction, the intermediate instruction and the object instruction belong to different instruction cycles, respectively.

Figures 4A, 4B:
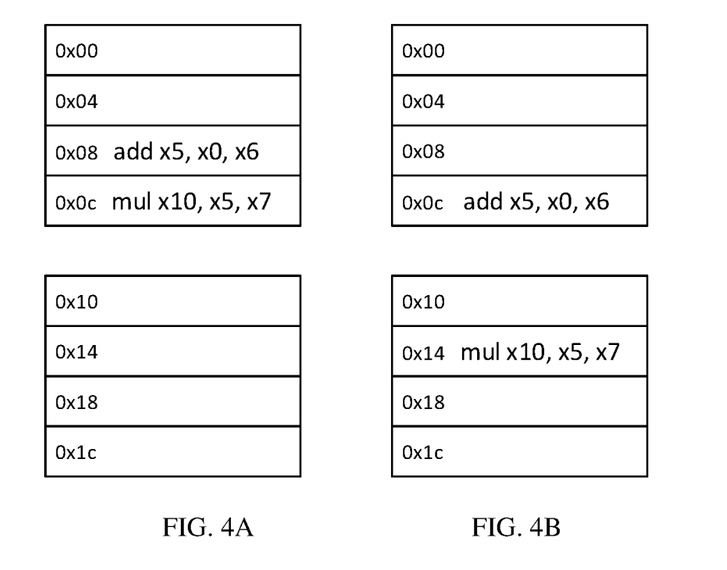
FIG. 4A illustrates a schematic diagram of the presence of operand forwarding in the same instruction cycle in the case of superscalar CPU.
FIG. 4B illustrates a schematic diagram of the presence of operand forwarding in different instruction cycles in the case of superscalar CPU.

For example, in a typical example, as shown in FIG. 4A, for example, in a four-channel superscalar CPU, in two adjacent instruction cycles, the previous instruction cycle has the following instruction sequence:
 0x08 add x5, x0, x6
 0x0c mul x10, x5, x7.

In the above-mentioned instruction sequence, because one source operand in the instruction add with a previous fetch address points to 0 (i.e., zero register), the instruction add is equivalent to the instruction c.mv; one of the source operands x5 (register x5) of the instruction mul with a following fetch address is identical to the destination operand x5 in the previous instruction add, so the operand forwarding (register x6) is performed, thereby obtaining the modified instruction mul: mul x10, x6, x7. Therefore, the instruction add and the modified instruction mul can be executed in parallel without affect the result of the instruction mul, and the efficiency of executing the instruction sequence in the CPU is improved.

For example, in a typical example, as shown in FIG. 4B, for example, in a four-channel superscalar CPU, two adjacent instruction cycles has the following instruction sequence:

0x0c add x5, x0, x6
0x14 mul x10, x5, x7.

In the above-mentioned instruction sequence, because one source operand of the instruction add with the previous fetch address in the previous cycle points to 0 (i.e., zero register), the instruction add is equivalent to the instruction c.mv; one of the source operands x5 (register x5) of the instruction mul with the following fetch address in the next cycle is identical to the target operand x5 in the previous instruction add, so the operand (register x6) forwarding can be performed, thereby obtaining the modified instruction mul: mul x10, x6, x7. Therefore, the instruction add and the instruction mul can be executed in parallel without affecting the result of the instruction mul, and the efficiency of executing the instruction sequence in the CPU is improved.

Figure 4C:
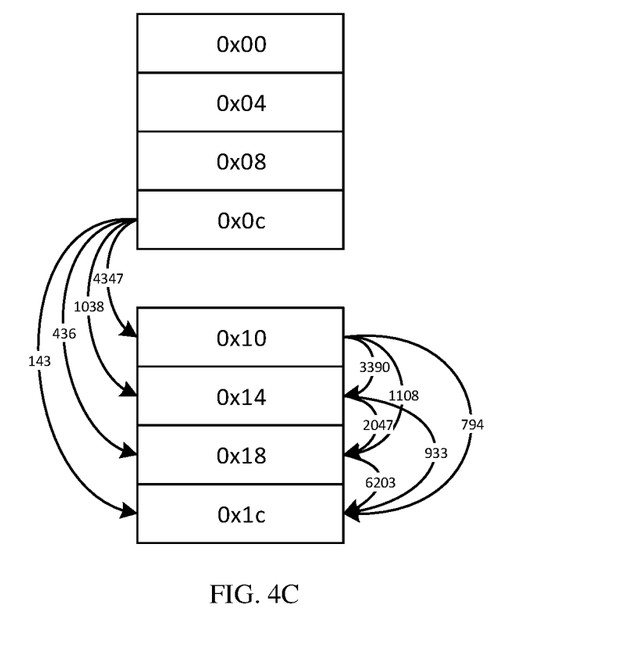
FIG. 4C illustrates a schematic diagram of a statistical result of running the CoreMark program in the case of superscalar CPU.

FIG. 4C shows the statistical data of the method for adjusting the instruction pipeline by adopting the embodiment of the present disclosure. The simulation adopts a four-channel superscalar out-of-order CPU to count the number of successful forwarding in running a single iteration of CoreMark program, and based on the statistical data, the four-channel superscalar out-of-order CPU achieve a performance improvement of 4.1% by adopting the operand forwarding technology of the embodiment of the present disclosure. In FIG. 4C, the arrow indicates that the operand forwarding is presented, and the number marked on the arrow indicates the number of successful operand forwarding in the simulation process. As shown in FIG. 4C, the method of the embodiment of the present disclosure supports forwarding across one cycle, the number of successful forwarding in the case where two instructions are directly adjacent to each other is far greater than the number of successful forwarding in the case where an interval presents between instructions, and the farther the interval between instructions, the fewer the number of successful forwarding. The case that two instructions are directly adjacent to each other may exist in the same instruction cycle or in adjacent instruction cycles. Therefore, the existence of "intermediate instruction" will reduce the success probability of forwarding.

The above description takes a four-channel superscalar CPU (for example, adopting the out-of-order technology) as an example, but the method for adjusting the instruction pipeline in the embodiments of the present disclosure is not limited to the specific specification of the superscalar CPU (for example, two-channel superscalar, four-channel superscalar, or the like).

Figure 5:
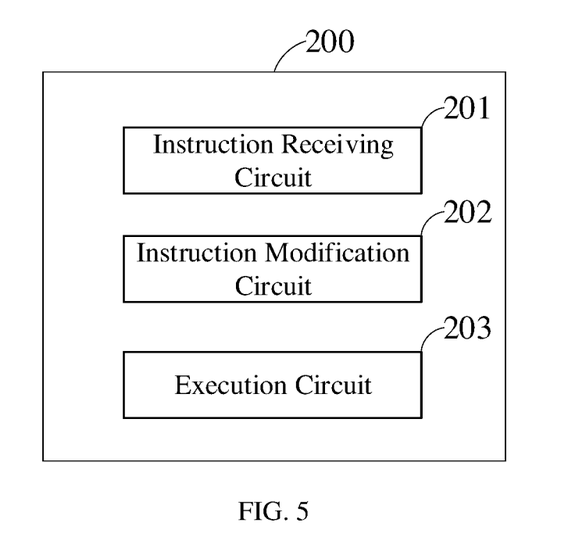
FIG. 5 illustrates a schematic diagram of an apparatus for adjusting an instruction pipeline provided by at least one embodiment of the present disclosure.

FIG. 5 is a schematic diagram of an apparatus for adjusting an instruction pipeline proposed by at least one embodiment of the present disclosure, and the apparatus 200 can be used to execute the method 100 shown in FIG. 2.

As shown in FIG. 5, the apparatus 200 for adjusting the instruction pipeline includes an instruction receiving circuit 201 and an instruction modification circuit 202. For example, the apparatus 200 for adjusting the instruction pipeline is applicable to a central processing unit (CPU), and the CPU may be a single-core processor or a multi-core processor, or the CPU may be a superscalar CPU, for example, a superscalar out-of-order CPU.

The instruction receiving circuit 201 is configured to receive a move-type instruction and an object instruction after the move-type instruction in an instruction sequence, the move-type instruction includes a target operand and a first source operand, the move-type instruction indicates to move a data of a source address indicated by the first source operand to a target address indicated by the target operand, and the object instruction includes an object source operand, indicating that an object operation is performed using a source address indicated by the object source operand.

The instruction modification circuit 202 is configured to replace the object source operand in the object instruction with the first source operand of the move-type instruction to obtain a modified instruction, in response to the target operand of the move-type instruction being identical to the object source operand of the object instruction.

For example, in at least one embodiment, the apparatus 200 for adjusting the instruction pipeline further includes an execution circuit 203, and the execution circuit 203 is configured to execute the modified instruction to perform the object operation using the source address indicated by the first source operand of the move-type instruction.

For example, in at least one embodiment, the instruction receiving circuit 201 is further configured to, before replacing the object source operand of the object instruction with the first source operand of the move-type instruction to obtain the modified instruction, determine that the target operand of the move-type instruction does not point to a target address where a constant is stored.

For example, in at least one embodiment, the instruction receiving circuit 201 is further configured to, before replacing the object source operand in the object instruction with the first source operand of the move-type instruction to obtain the modified instruction, determine that an execution order of the move-type instruction and the object instruction in the instruction sequence is not broken by a previous transfer instruction.

For example, in at least one embodiment, the instruction receiving circuit 201 is further configured to, before replacing the object source operand in the object instruction with the first source operand of the move-type instruction to obtain the modified instruction, receive an intermediate instruction between the move-type instruction and the object instruction in the instruction sequence, the intermediate instruction includes an intermediate target operand, and the instruction receiving circuit 201 is further configured to determine that the intermediate target operand of the intermediate instruction is different from the target operand of the move-type instruction.

For example, in at least one embodiment, the instruction receiving circuit 201 is further configured to, before replacing the object source operand in the object instruction with the first source operand of the move-type instruction to obtain the modified instruction, receive an intermediate instruction between the move-type instruction and the object instruction in the instruction sequence, the intermediate instruction includes an intermediate target operand, and the instruction receiving circuit 201 is further configured to determine that the intermediate target operand of the intermediate instruction is different from the first source operand of the move-type instruction.

For example, the instruction receiving circuit 201, the instruction modification circuit 202, and the execution circuit 203 may be implemented by hardware, software, firmware, and any feasible combination thereof, which is not limited in the present disclosure.

The technical effect of the apparatus 200 for adjusting the instruction pipeline is the same as the technical effect of the method 100 for adjusting the instruction pipeline shown in FIG. 2, and the apparatus 200 can be used to significantly improve the performance of the processor (CPU), which will not be repeated herein.

At least one embodiment of the present disclosure further provides an apparatus for adjusting an instruction pipeline, which includes a memory configured to non-temporarily store a computer-executable instruction, and a processor (a processing apparatus) configured to run the computer-executable instruction, and the computer-executable instruction, when run by the processor, executes the method for adjusting the instruction pipeline proposed by at least one embodiment of the present disclosure. Similarly, for example, the apparatus for adjusting the instruction pipeline is applicable to a central processing unit (CPU), and the CPU may be a single-core processor or a multi-core processor, or the CPU may be a superscalar CPU, for example, a superscalar out-of-order CPU.

Figure 6:
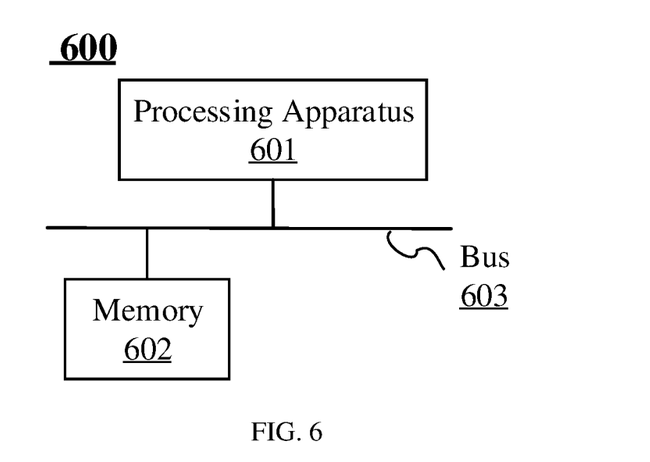
FIG. 6 illustrates a schematic diagram of a data processing device provided by at least one embodiment of the present disclosure.

FIG. 6 illustrates a schematic diagram of a data processing device 600 according to at least one embodiment of the present disclosure. As shown in FIG. 6, the data processing device 600 according to the embodiment of the present disclosure includes a processing apparatus 601 and a memory 602, and the processing apparatus 601 and the memory 602 may be interconnected via a bus 603.

The processing apparatus 601 can perform various actions and processes according to a program or code stored in the memory 602. Specifically, the processing apparatus 601 may be an integrated circuit chip with signal processing capability. For example, the above-mentioned processing apparatus may be a general-purpose processor, a digital signal processor (DSP), an application specific integrated circuit (ASIC), a field programmable gate array (FPGA) or other programmable logic device, a discrete gate or transistor logic device, or a discrete hardware component. Various methods, steps, flow charts and logic block diagrams disclosed in the embodiments of the present disclosure can be implemented or executed by the processing apparatus 601. The general-purpose processor may be a microprocessor or any conventional processor, etc., and may be X86 architecture or ARM architecture, or the like.

The memory 602 stores at least one computer-executable instruction, and the computer-executable instruction, when executed by the processing apparatus 601, can implement the method for adjusting the instruction pipeline provided by at least one embodiment of the present disclosure. The memory 602 may be a volatile memory or a nonvolatile memory, or may include both volatile and nonvolatile memories. The nonvolatile memory may be a read only memory (ROM), a programmable read only memory (PROM), an erasable programmable read only memory (EPROM), an electrically erasable programmable read only memory (EEPROM) or a flash memory. The volatile memory may be a random-access memory (RAM), which is used as an external cache. By way of illustration but not limitation, many forms of RAM are available, such as a static random-access memory (SRAM), a dynamic random-access memory (DRAM), a synchronous dynamic random-access memory (SDRAM), a double data rate synchronous dynamic random-access memory (DDRSDRAM), an enhanced synchronous dynamic random-access memory (ESDRAM), a synchronous link dynamic random-access memory (SLDRAM) or a direct memory bus random-access memory (DRRAM). It should be noted that the memory of the method described herein is intended to include, but is not limited to, these and any other suitable type of memory.

The embodiments of the present disclosure further provide a processor, which includes the apparatus for adjusting the instruction pipeline as described above, and in at least some embodiments, may further include a fetch unit, a decode unit, a rename register, an issue unit, a commit unit, and the like. For example, the processor may be a central processing unit (CPU), the CPU may be a single-core processor or a multi-core processor, or the CPU may be a superscalar CPU, for example, a superscalar out-of-order CPU.

The embodiments of the present disclosure further provide a computer-readable storage medium for non-transitorily storing at least one computer-executable instruction, and the computer-executable instruction, when executed by a processor, can achieve the method for adjusting the instruction pipeline provided by at least one embodiment of the present disclosure.

Similarly, the computer-readable storage medium in the embodiment of the present disclosure may be a volatile memory or a nonvolatile memory, or may include both the volatile and the nonvolatile memory. It should be noted that the memory of the method described herein is intended to include, but is not limited to, these and any other suitable type of memory.

The embodiments of the present disclosure further provide a computer program product or a computer program, the computer program product or the computer program includes at least one computer instruction, and the computer instruction is stored in a computer-readable storage medium. The processor of the computer device reads the computer instruction from the computer-readable storage medium, and the processor executes the computer instruction, so that the computer device executes the method for adjusting the instruction pipeline according to the embodiment of the present disclosure.

The technical effect of the above-mentioned apparatus, processor and storage medium for adjusting the instruction pipeline is the same as those of the method 100 for adjusting the instruction pipeline shown in FIG. 2, and they can all be used to significantly improve the performance of the processor (CPU), which will not be repeated herein.

For the present disclosure, the following statements should be noted:

(1) The drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only exemplary embodiments of the present disclosure, and are not intended to limit the protection scope of the present disclosure, and the protection scope of the present disclosure is determined by the appended claims.

What is claimed is:

1. A method for adjusting an instruction pipeline of a processor, comprising:
   receiving, by the processor, a move-type instruction, wherein the move-type instruction comprises a target operand and a first source operand, and the move-type instruction indicates to move a data of a source address indicated by the first source operand to a target address indicated by the target operand;

receiving, by the processor, an object instruction located after the move-type instruction in an instruction sequence to be executed by the processor, wherein the object instruction comprises an object source operand, indicating that an object operation is performed with a source address indicated by the object source operand;

replacing, by the processor, the object source operand in the object instruction with the first source operand of the move-type instruction to obtain a modified instruction, in response to the target operand of the move-type instruction being identical to the object source operand of the object instruction; and executing, by the processor, the modified instruction to perform the object operation with the source address indicated by the first source operand of the move-type instruction, wherein before replacing, by the processor, the object source operand in the object instruction with the first source operand of the move-type instruction to obtain the modified instruction, the method further comprises:

receiving, by the processor, an intermediate instruction between the move-type instruction and the object instruction in the instruction sequence, wherein the intermediate instruction comprises an intermediate target operand; and determining, by the processor, that the intermediate target operand of the intermediate instruction is different from the first source operand of the move-type instruction.

2. The method according to claim 1, before replacing, by the processor, the object source operand in the object instruction with the first source operand of the move-type instruction to obtain the modified instruction, further comprising:

determining, by the processor, that the target operand of the move-type instruction does not point to a target address where a constant is stored.

3. The method according to claim 1, before replacing, by the processor, the object source operand in the object instruction with the first source operand of the move-type instruction to obtain the modified instruction, further comprising:

determining, by the processor, that an execution order of the move-type instruction and the object instruction in the instruction sequence is not broken by a previous transfer instruction.

4. The method according to claim 1, before replacing, by the processor, the object source operand in the object instruction with the first source operand of the move-type instruction to obtain the modified instruction, further comprising:

receiving, by the processor, an intermediate instruction between the move-type instruction and the object instruction in the instruction sequence, wherein the intermediate instruction comprises an intermediate target operand; and determining, by the processor, that the intermediate target operand of the intermediate instruction is different from the target operand of the move-type instruction.

5. The method according to claim 4, wherein the processor is a superscalar processor, the move-type instruction, the intermediate instruction and the object instruction are in a same instruction cycle, or at least two of the move-type instruction, the intermediate instruction or the object instruction are in different instruction cycles.

6. The method according to claim 1, wherein the processor is a superscalar processor, the object instruction and the move-type instruction belong to a same instruction cycle or different instruction cycles.

7. The method according to claim 1, wherein the move-type instruction comprises a move instruction or an equivalent instruction which is equivalent to the move instruction.

8. The method according to claim 1, wherein the move-type instruction further comprises a second source operand, and the second source operand points to zero.

9. The method according to claim 1, wherein the processor is a superscalar processor, the move-type instruction, the intermediate instruction and the object instruction are in a same instruction cycle, or at least two of the move-type instruction, the intermediate instruction or the object instruction are in different instruction cycles.

10. An apparatus for adjusting an instruction pipeline of a processor, comprising:

an instruction receiving circuit, configured to receive a move-type instruction and an object instruction located after the move-type instruction in an instruction sequence to be executed by the processor, wherein the move-type instruction comprises a target operand and a first source operand, the move-type instruction indicates to move a data of a source address indicated by the first source operand to a target address indicated by the target operand, and the object instruction comprises an object source operand, indicating that an object operation is performed using a source address indicated by the object source operand;

an instruction modification circuit, configured to replace the object source operand in the object instruction with the first source operand of the move-type instruction to obtain a modified instruction, in response to the target operand of the move-type instruction being identical to the object source operand of the object instruction;

an execution circuit, configured to execute the modified instruction to perform the object operation with the source address indicated by the first source operand of the move-type instruction, wherein the instruction receiving circuit is further configured to, before replacing the object source operand in the object instruction with the first source operand of the move-type instruction to obtain the modified instruction, receive an intermediate instruction between the move-type instruction and the object instruction in the instruction sequence, wherein the intermediate instruction comprises an intermediate target operand; and determine that the intermediate target operand of the intermediate instruction is different from the first source operand of the move-type instruction.

11. An apparatus for adjusting an instruction pipeline of a processor, comprising:

a memory, configured to non-temporarily store at least one computer-executable instruction; and a processing apparatus, configured to run the computer-executable instruction, wherein when the computer-executable instruction is run by the processing apparatus, a method for adjusting the instruction pipeline of the processor is executed, and the method comprises:

receiving, by the processor, a move-type instruction, wherein the move-type instruction comprises a target operand and a first source operand, and the move-type instruction indicates to move a data of a source address indicated by the first source operand to a target address indicated by the target operand;

receiving, by the processor, an object instruction located after the move-type instruction in an instruction sequence to be executed by the processor, wherein the object instruction comprises an object source operand, indicating that an object operation is performed with a source address indicated by the object source operand;

replacing, by the processor, the object source operand in the object instruction with the first source operand of the move-type instruction to obtain a modified instruction, in response to the target operand of the move-type instruction being identical to the object source operand of the object instruction; and executing, by the processor, the modified instruction to perform the object operation with the source address indicated by the first source operand of the move-type instruction, wherein before replacing, by the processor, the object source operand in the object instruction with the first source operand of the move-type instruction to obtain the modified instruction, the method further comprises:

receiving, by the processor, an intermediate instruction between the move-type instruction and the object instruction in the instruction sequence, wherein the intermediate instruction comprises an intermediate target operand; and determining, by the processor, that the intermediate target operand of the intermediate instruction is different from the first source operand of the move-type instruction.

12. A non-transitory storage medium, storing at least one computer-executable instruction non-transitorily, wherein when the computer-executable instruction is executed by a computer, the method for adjusting the instruction pipeline according to claim 1 is executed.

* * * * *